(12) United States Patent
Kim et al.

(10) Patent No.: US 7,330,655 B2
(45) Date of Patent: Feb. 12, 2008

(54) WDM/SCM-PON AND MEDIA ACCESS CONTROL METHOD FOR ASYMMETRIC PACKET COMMUNICATION IN THE SAME

(75) Inventors: Tae Yeon Kim, Daejeon (KR); Jeong Ju Yoo, Daejeon (KR); Byoung Whi Kim, Kyungki-do (KR)

(73) Assignee: Electronics and Telecommunications Research Institute (KR)

( * ) Notice: Subject to any disclaimer, the term of this patent is extended or adjusted under 35 U.S.C. 154(b) by 531 days.

(21) Appl. No.: 10/912,340

(22) Filed: Aug. 4, 2004

(65) Prior Publication Data

US 2005/0129400 A1   Jun. 16, 2005

(30) Foreign Application Priority Data

Dec. 15, 2003   (KR) .................... 10-2003-0091332

(51) Int. Cl.
*H04J 14/02* (2006.01)
(52) U.S. Cl. ................ 398/72; 398/74; 398/76
(58) Field of Classification Search ............ 398/70, 398/71, 72, 74, 76, 51, 66, 67, 68, 69
See application file for complete search history.

(56) References Cited

U.S. PATENT DOCUMENTS

| | | | |
|---|---|---|---|
| 5,598,287 A * | 1/1997 | Van Driel et al. ............ 398/76 |
| 6,317,234 B1 | 11/2001 | Quayle | |
| 6,438,130 B1 * | 8/2002 | Kagan et al. ............... 370/392 |
| 6,452,945 B1 | 9/2002 | Upham et al. | |
| 6,577,414 B1 | 6/2003 | Feldman et al. | |
| 2002/0010791 A1 * | 1/2002 | Kalkunte et al. ........... 709/238 |
| 2003/0152389 A1 * | 8/2003 | Sala et al. .................... 398/98 |

* cited by examiner

*Primary Examiner*—Christina Leung
(74) *Attorney, Agent, or Firm*—Blakely Sokoloff Taylor & Zafman

(57) ABSTRACT

The present invention relates to a WDM/SCM-PON and a media access control method for asymmetric packet communication in the same. In the WDM/SCM-PON, each SCM channel is classified and used as a link by adopting an SCM technique of subdividing a wavelength band of up/downstream data links between an OLT and ONTs into frequency bands, and the ONTs are formed so that a certain SCM channel is independently distributed not fixedly assigned. Accordingly, an inventory problem, which can be generated in WDM/SCM, is prevented before happens, asymmetric dynamic band allocation is performed, and asymmetric service of up/downstream transmission is supported. As a result, a band required for next generation service is dynamically provided, optical interference effect is minimized, and Ethernet compatibility is provided so that Ethernet service suitable for providing IP service can be accommodated.

11 Claims, 9 Drawing Sheets

SUB-CARRIER MULTIPLEXING WITH OPTICAL PASSIVE SPLITTER

TIME DIVISION MULTIPLEXING WITH OPTICAL PASSIVE SPLITTER

PACKET SWITCHING WITH ACTIVE NODE

SUB-CARRIER MULTIPLEXING WITH OPTICAL PASSIVE SPLITTER

WDM/SCM-PON AND MEDIA ACCESS CONTROL METHOD FOR ASYMMETRIC PACKET COMMUNICATION IN THE SAME

BACKGROUND OF THE INVENTION

This application claims the priority of Korean Patent Application No. 2003-91332, filed on Dec. 15, 2003, in the Korean Intellectual Property Office, the disclosure of which is incorporated herein in its entirety by reference.

1. Field of the Invention

The present invention relates to a passive optical network (PON), and more particularly, to the PON and a media access control method for the same.

2. Description of the Related Art

In order to provide data service to subscribers using typical telephone lines, x-digital subscriber line (XDSL) technology has been developed and used. Besides, a cable network using coaxial cable has been suggested as a plan for another subscriber data service. When taking current Internet traffic of subscribers into consideration, there seems to be no problem till now. However, when intending to popularize future very high speed services such as small office home office (SOHO), a teleconference service, a high definition television (HDTV) class video service, tele-education, and telemedicine, it is predicted that it is difficult to fully provide wideband and high quality services using current networks with band and distance limitation.

To fulfill the future very high speed services, optical communication technology, such as fiber-to-the-curb (FTTC) and fiber-to-the-home (FTTH), is suggested, and PON technology is coming to the front as a subscriber access method for providing wideband services required by users. The PON forms a tree-shaped distributed topology sharing a link between an optical line termination (OLT) and a passive optical splitter and diverging from the passive optical splitter to subscribers using a plurality of optical network units (ONUs) and is suitable for broadcasting services. That is, in a downstream service, a data broadcasting service is smoothly achieved according to characteristics of the passive optical splitter, however, in an upstream service, contention occurs in the shared link between the OLT and the passive optical splitter. To prevent the contention, a time division multiplexing (TDM) method, in which mutual communication is performed not so as to be overlapped by temporally dividing a same frequency band, is used for an asynchronous transfer mode (ATM)-PON and an Ethernet-PON (EPON).

FIG. 1 illustrates data transmission in a PON based on TDM. FIG. 1 shows a general solution for providing an FTTH service based on one carrier.

Referring to FIG. 1, A passive optical splitter is placed between service providers (SPs) connected to an OLT via an external network and subscribers connected to optical network terminals (ONTs), and packets provided from the SPs are multidropped and transmitted to a plurality of ONTs. Here, the downstream packets are smoothly diverged in an optical domain, optical-electronic converted in the plurality of ONTs, and filtered using addresses of the packets or unique IDs (for example, LLID of EPON). Upstream packets are separately transmitted during timeslots with a predetermined time period at time allocated for each ONT. At this time, for downstream packets from the OLT to the ONTs, no sharing method is necessary, however, for upstream packets from the ONTs to the OLT, a TDM method is necessary.

That is, a TDM-PON has strong points in optical cable installation, expandability, and economical efficiency, which are advantages of a PON service, does not require special control for a downstream service since the TDM method is used, and makes a high speed downstream service possible. However, the TDM-PON can make problems due to complexity of the TDM method or a TDM delay of packet transmission. Also, capacity of packets in a second layer of Open Systems Interconnection (OSI), which should be processed in the ONT for each subscriber, may be so large that cannot be processed with a link speed between the OLT and the ONT.

FIG. 2 illustrates data transmission in an active optical network (AON) connected to subscribers via an active node. A switching method shown in FIG. 2 is an active switching method called a home-run method.

Referring to FIG. 2, the active switching method divides and uses a physical link between an OLT and ONTs via the active node using a point-to-point method. The active node should find out a target port through optical-to-electrical conversion and perform optical transmission to the ONTs or the OLT through electrical-to-optical conversion.

In the AON, each user's ONT is independent, and downstream and upstream services can be provided using a same method. However, the AON is worse than the PON in optical cable installation, expandability, and economical efficiency, and in the AON, there is overhead of the optical-to-electrical conversion and the electrical-to-optical conversion in subscriber distribution and connection.

SUMMARY OF THE INVENTION

The present invention provides a wavelength division multiplexing (WDM)/sub-carrier multiplexing (SCM)-PON for asymmetric packet communication, which satisfies Ethernet compatibility to fulfill typical Internet services, improves network efficiency by supporting an asymmetric service of upstream/downstream traffic, and effectively shares upstream/downstream SCM channels among a plurality of subscribers and a media access control (MAC) method for the same.

According to an aspect of the present invention, there is provided a WDM/SCM-PON, which has passive distributors based on one of a WDM method and an SCM method, comprising: an OLT, which provides an independent link by dividing SCM channels of a wavelength into upstream channels and downstream channels; and a plurality of ONTs, each which is connected to the OLT via the passive distributor, performs up/downstream transmission, variably operates the SCM channels, and forms an independent link with the OLT.

According to another aspect of the present invention, there is provided a frame distribution method for media access control of asymmetric packet communication in a WDM/SCM-PON, the method comprising: (a) reading a destination address (DA) from a frame header of a packet received from an OLT or an ONT; (b) performing lookup of the DA in a forwarding database; (c) if the DA is applicable to a single channel with a specified port as a result of the lookup in step (b), forwarding the packet to the specified port; and (d) if the DA is applicable to a channel of a channel group without a specified port as a result of the lookup in step (b), selecting a target port using a hash function having keys of the DA and a channel group ID and forwarding the packet to the target port.

According to another aspect of the present invention, there is provided a frame distribution method for media access control of asymmetric packet communication in a WDM/SCM-PON, the method comprising: (a) reading a DA from a frame header of a packet received from an OLT or an ONT; (b) performing lookup of the DA in a forwarding database and determining a VGP to be forwarded; (c) if the VGP is determined as a result of the lookup in step (b), determining whether there is a MAC trace port which a packet having a DA equal to the DA has passed through; (d) if the VGP is not determined as a result of the lookup in step (b), after the VGP is determined, determining whether there is the MAC trace port; (e) if there is the MAC trace port as a result of determination in steps (c) and (d), forwarding the packet to the MAC trace port; and (f) if there is not the MAC trace port as a result of determination in steps (c) and (d), selecting a target port using a hash function having parameters of the DA and a port group and forwarding the packet to the target port.

BRIEF DESCRIPTION OF THE DRAWINGS

The above and other features and advantages of the present invention will become more apparent by describing in detail exemplary embodiments thereof with reference to the attached drawings in which.

DESCRIPTION OF REFERENCE NUMBERS OF MAIN PARTS OF DRAWINGS

Figure 1:
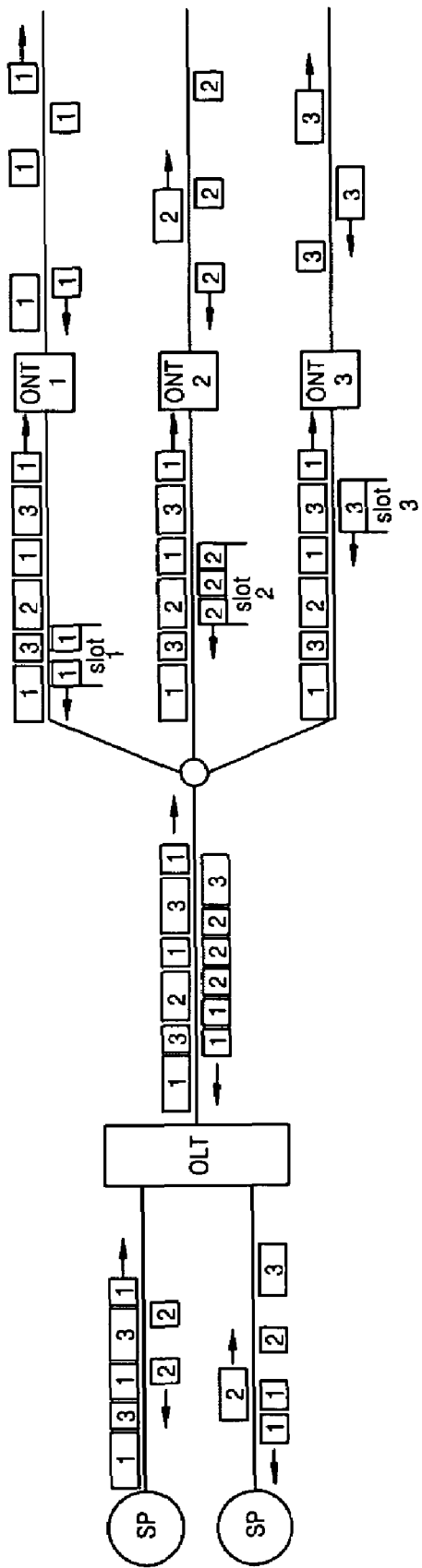
FIG. 1 illustrates data transmission in a PON based on TDM.
Figure 2:
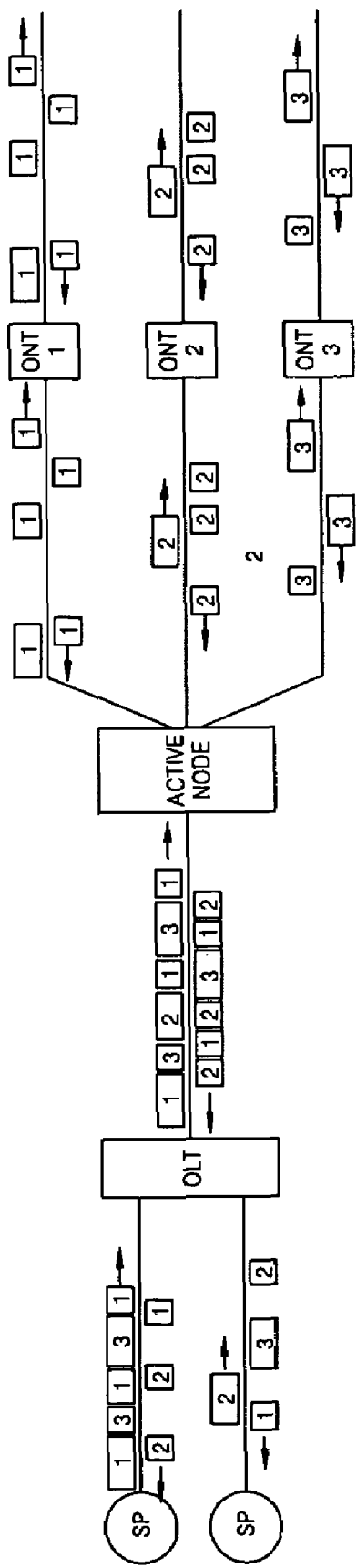
FIG. 2 illustrates data transmission in an AON connected to subscribers via an active node.

300: OLT
310: packet processing unit
340: asymmetric channel group control unit
350: distributor
370: collector
400, . . . , 900: ONT
410: SCM channel processing unit
440: asymmetric channel control unit
450, . . . , 490: distributor
470, . . . , 970: collector

DETAILED DESCRIPTION OF THE INVENTION

Hereinafter, the present invention will now be described more fully with reference to the accompanying drawings, in which exemplary embodiments of the invention are shown.

Figure 3:
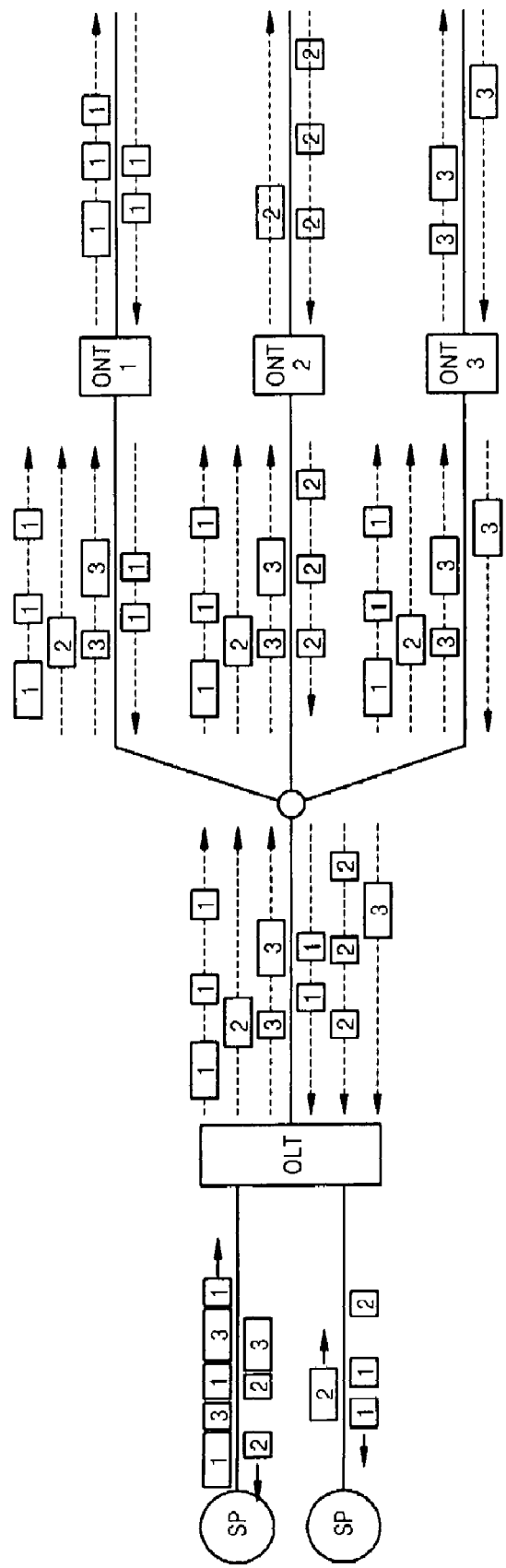
FIG. 3 illustrates data transmission in a WDM/SCM-PON according to an exemplary embodiment of the present invention.

FIG. 3 illustrates data transmission in a WDM/SCM-PON according to an exemplary embodiment of the present invention. Since an optical network shown in FIG. 3 is a WDM-PON, a WDM multiplexer/demultiplexer is required. However, since the optical network operates based on a wavelength, the WDM multiplexer/demultiplexer is omitted.

Referring to FIG. 3, a passive optical splitter based on WDM/SCM is placed between SPs connected to an OLT via an external network and subscribers connected to a plurality of ONTs, and packets provided from the SPs are multi-dropped and transmitted to the plurality of ONTs. Here, SCM technology of subdividing a wavelength band into frequency bands is applied to an upstream/downstream data link between the OLT and the plurality of ONTs. Each SCM channel is classified with a link. That is, an ONT1 transmits data using a first channel, an ONT2 transmits data using a second channel, and an ONT3 transmits data using a third channel.

The OLT allocates a simplex channel per a sub-carrier band so that a plurality of subscribers share wavelength resources more efficiently and deals with the plurality of ONTs using a link or a link group. Each ONT includes at most one channel group, and RF bands of the SCM channels formed in each ONT are adjustable. This is to solve an inventory problem of the ONTs connected to the OLT, and the SCM channel bands are variably used under control of the OLT.

In the WDM/SCM-PON with characteristics described above, since advantages of the PON, such as optical cable installation, expandibility, and economical efficiency, are observed and independent channels are guaranteed, correlations with other subscribers are little and upstream transmission using different timeslots is unnecessary. Also, a link of a subscriber distribution/connection network between the OLT and the ONTs can be guaranteed without optical-to-electrical conversion. The configuration of the WDM/SCM-PON will now be described in detail.

Figure 4:
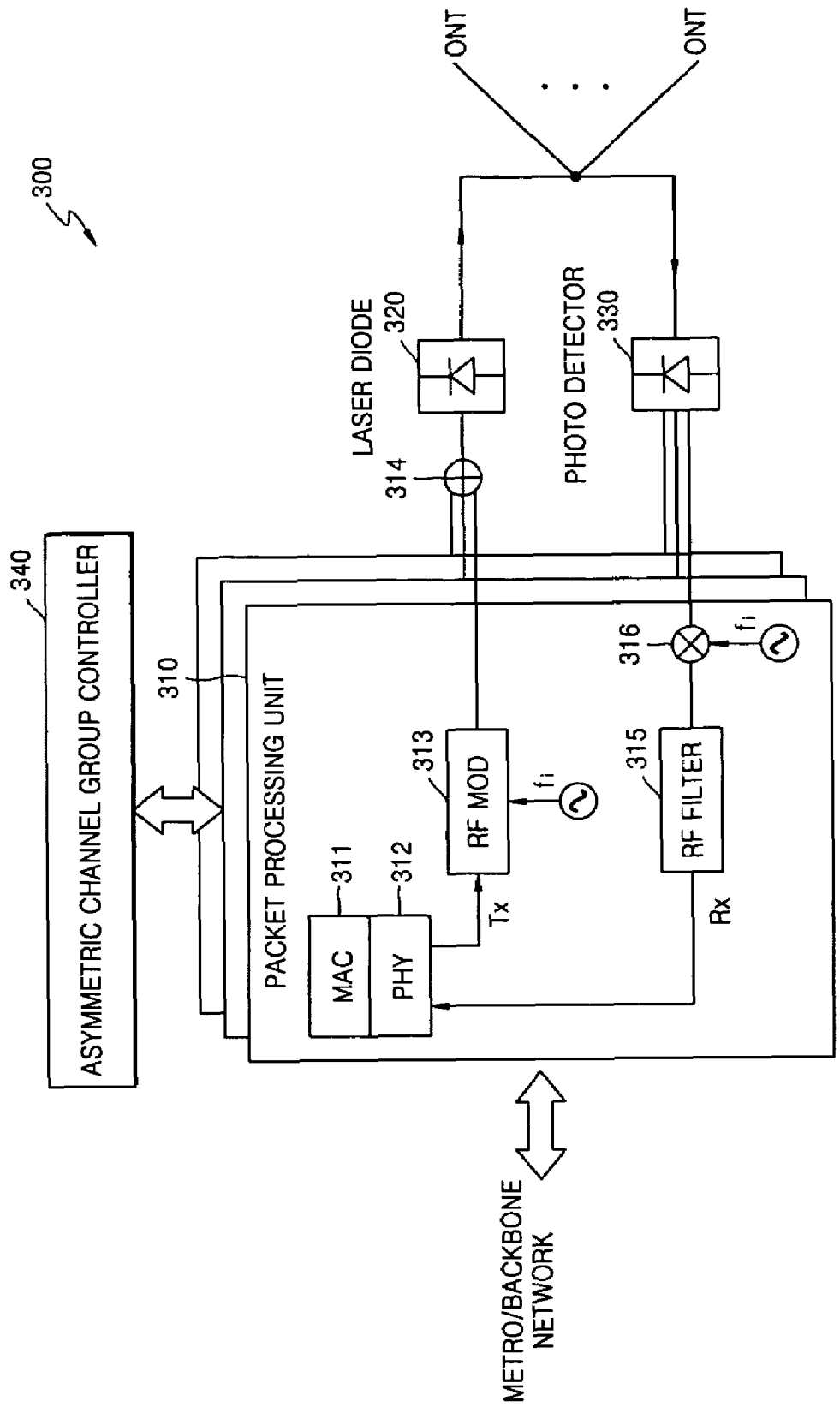
FIG. 4 is a block diagram of an OLT, which manages a plurality of SCM channels in wavelengths and performs access control, according to an exemplary embodiment of the present invention.

FIG. 4 is a block diagram of an OLT 300, which manages a plurality of SCM channels in wavelengths and performs access control, according to an exemplary embodiment of the present invention.

Referring to FIG. 4, the OLT 300 includes a plurality of packet processing units 310, an adder 314, an optical transmitter 320, an optical receiver 330, and an asymmetric channel group control unit 340.

Each packet processing unit 310 included in the OLT 300 includes an RF modulator 313, an RF filter 315, and a mixer 316. The packet processing unit 310 allocates a simplex channel per a sub-carrier band so that a plurality of subscribers share wavelength resources more efficiently. In detail, the RF modulator 313 generates a downstream SCM channel by modulating a link corresponding to a transmitting signal (Tx) of an MAC/PHY layer 311 and 312 into a specifically fixed RF frequency band, the downstream SCM channel generated by the RF modulator 313 is added to downstream SCM channels of other RF frequency bands using the adder 314, and the added downstream SCM channels are transmitted to a plurality of ONTs via the optical transmitter 320. Upstream channels transmitted from the plurality of ONTs are received via the optical receiver 330 having a specified WDM band, each upstream channel is detected by the mixer 316 included in each packet processing unit 310, and the detected upstream channel is filtered into an upstream SCM channel corresponding to an RF band equal to a link corresponding to a receiving signal (Rx) of the MAC/PHY layer 311 and 312 by the RF filter 315. As the result, the OLT 300 has up/downstream channels fixed for ports, respectively.

The asymmetric channel group control unit 340 performs a function of dealing with a plurality of ONTs as a link or a link group. Thus, when data frames are input from a metro network or a backbone network to the OLT 300, the asymmetric channel group control unit 340 performs a function of distributing and transmitting a data frame to a target ONT using a corresponding channel group by switching the data frames between the OLT 300 and the plurality of ONTs. Also, the asymmetric channel group control unit 340 performs a frame collecting function of collecting a data frame transmitted using a channel group allocated to a specified ONT. Besides, when SCM channel groups are dynamically changed between the plurality of ONTs in order to obey an operational request or guarantee QoS, the asymmetric channel group control unit 340 controls the dynamic change.

Figure 5:
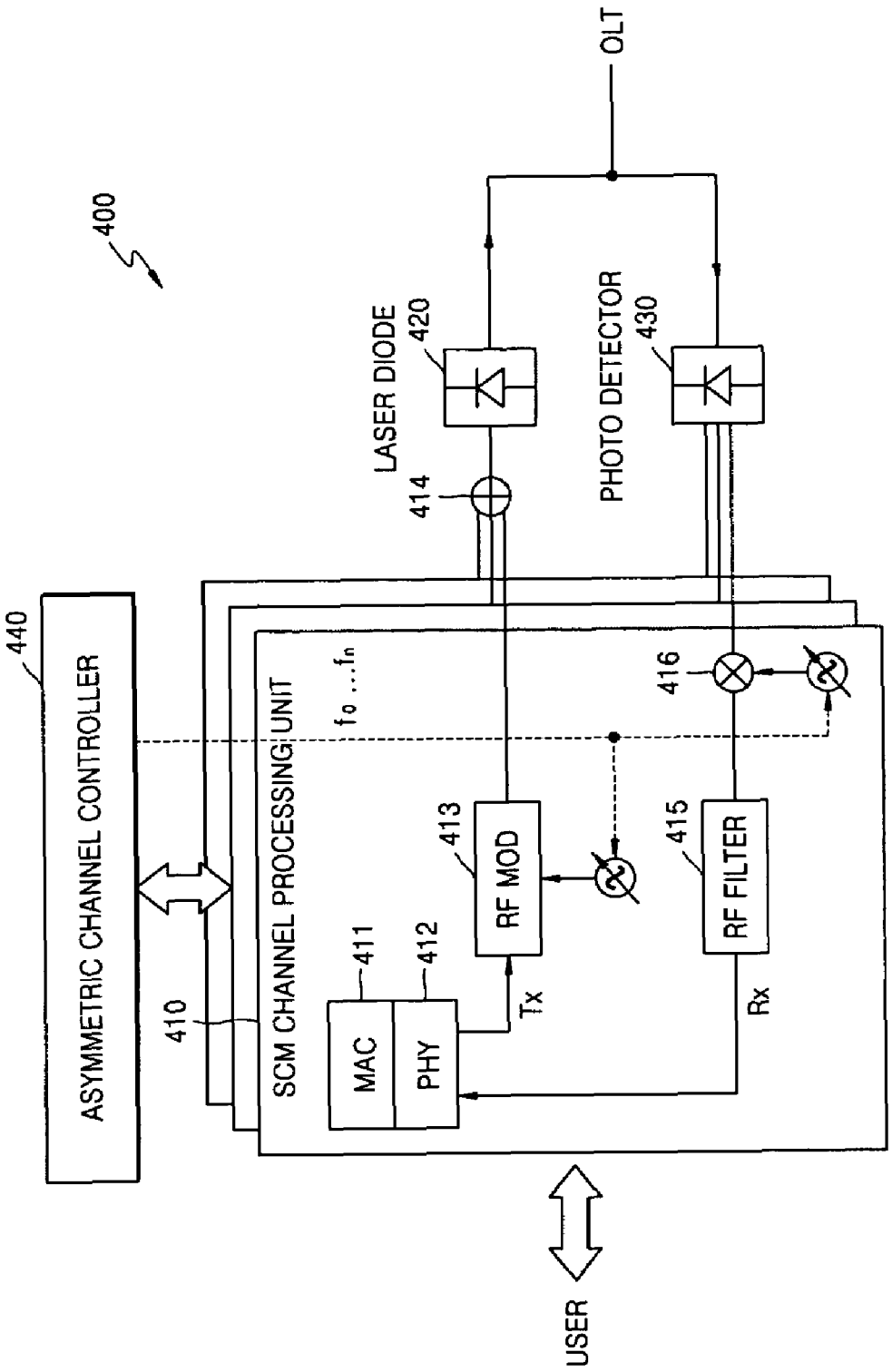
FIG. 5 is a block diagram of an ONT, which accesses to the OLT using more than one SCM channel, according to an exemplary embodiment of the present invention.

FIG. 5 is a block diagram of an ONT 400, which accesses to the OLT 300 using more than one SCM channel, according to an exemplary embodiment of the present invention.

The ONT 400 includes a plurality of SCM channel processing unit 410, an adder 414, an optical transmitter 420, an optical receiver 430, and an asymmetric channel control unit 440.

Each SCM channel processing unit 410 included in the ONT 400 includes an RF modulator 413, an RF filter 415, and a mixer 416. The SCM channel processing unit 410 assigns a Tx link of an MAC/PHY layer 411 and 412 for packet processing as an upstream SCM channel and an Rx link as a downstream SCM channel. That is, the ONT 400 performs operations opposed to those of the OLT 300 described in FIG. 4.

The ONT 400 includes at most one channel group, and an RF band of the SCM channel allocated to the ONT 400 is adjustable. This is to solve an inventory problem of the ONT 400 connected to the OLT 300, and the SCM channel band is variably used under control of the OLT 300.

Accordingly, unlike the asymmetric channel group control unit 340 included in the OLT 300, the asymmetric channel control unit 440 does not perform channel allocation, distribution, or collection functions of a plurality of channel groups. However, the asymmetric channel control unit 440 variably controls an SCM frequency band in response to a control signal transmitted from the OLT 300.

Figure 6:
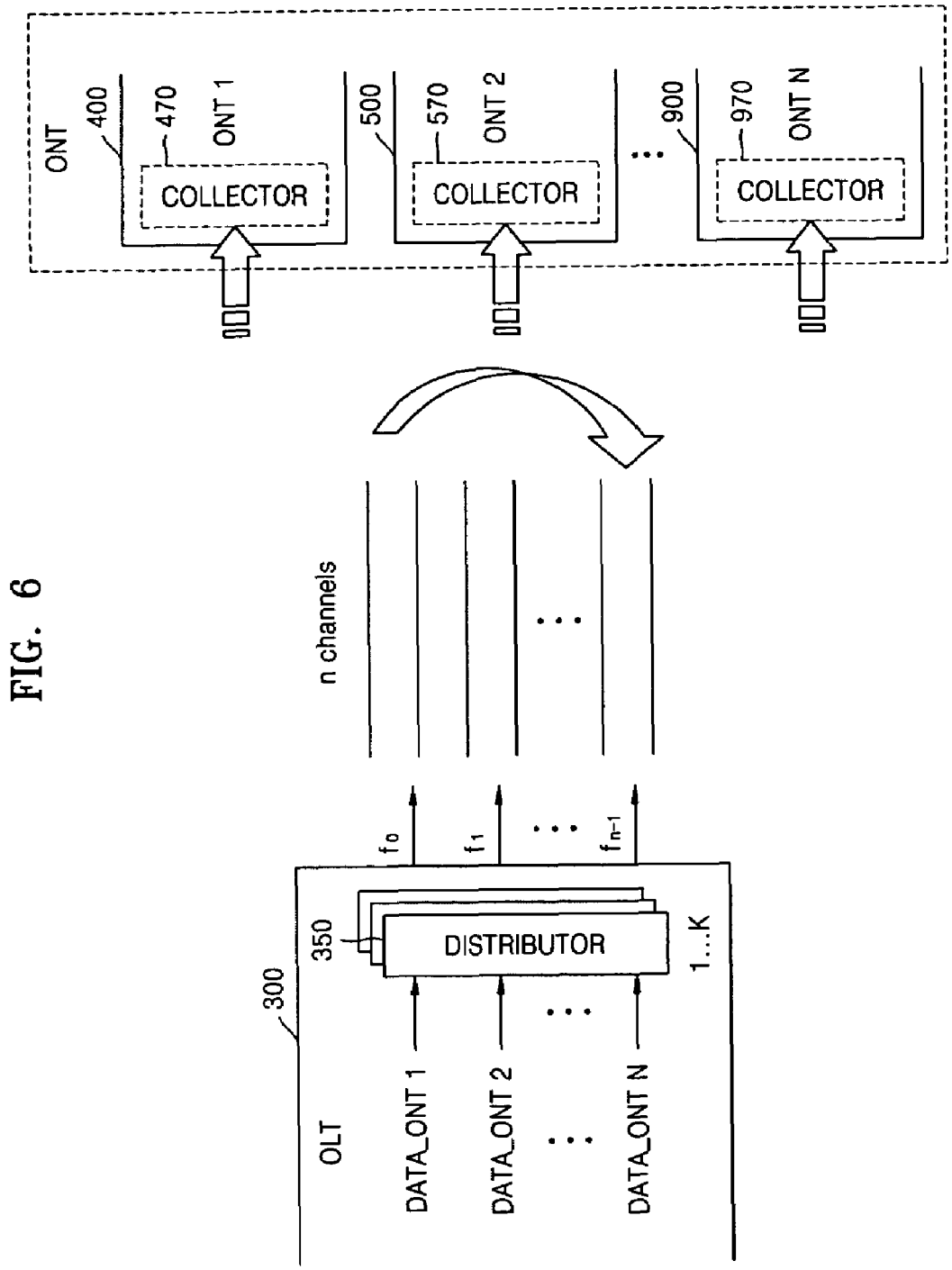
FIG. 6 illustrates a downstream media access mechanism according to an exemplary embodiment of the present invention.

FIG. 6 illustrates a downstream media access mechanism according to an exemplary embodiment of the present invention.

Referring to FIG. 6, a downstream is performed by dividing a wavelength band into n SCM channels, wherein the wavelength band is made up of a set $F=\{f_0, f_1, \ldots, f_{n-1}\}$ of SCM channels. The number N of ONTs connected to one wavelength band of the OLT 300 is maximum n, and if N=n, all channels are distributed to the ONTs, respectively.

When a channel group having more than two channels is allocated to an ONT, a distributor 350 managed by the OLT 300 distributes frames to the channel group when transmitting data DATA_ONT1, ..., DATA_ONTN. Therefore, the number k of total distributors cannot exceed maximum n/2.

When each ONT starts to operate, the asymmetric channel group control unit 340 of the OLT 300 synchronizes each channel with the asymmetric channel control unit 440 of each ONT. As a result, an ONT can be connected to the OLT 300 using a channel or a channel group including a plurality of channels. Therefore, the number k of distributors 350 is dynamically varied.

Unlike the OLT 300, when data frames DATA_ONT1, ..., DATA_ONTN are transmitted using the channel group, each of ONTs 400, ..., 900 needs a collector 470 collecting the data frames as a link. That is, when the ONTs 400, ..., 900 are synchronized with the OLT 300, collectors 470, ..., 490 may be or may not be necessary for the ONTs 400, ..., 900. However, the number of total collectors 470, ..., 490 activated in from a first ONT 400 to an Nth ONT 900 is equal to the number of distributors 350 of the OLT 300. For example, when an SCM channel distributed to an ONTx is $F_x=\{f_{x1}, f_{x2}, \ldots, f_{xm}\}$, x=1, 2, ..., N, $F_x \subseteq F$, cardinality of $F_x$ is a positive number, and the cardinality of $F_x$ cannot be lager than the number n of total channels. The above is represented as following Equation 1.

$$0 \leq |F_x| \leq n \qquad \text{[Equation 1]}$$

When $|F_x|$ is equal to n, a specified ONTx uses all channels, and when $|F_x|$ is equal to 0, the ONTx is not used, and when $|F_x|$ is equal to 1, a single channel is assigned to the ONTx.

Since a same channel cannot be assigned to two or more ONTs, a following condition must be satisfied.

$$F_i \cap F_j = 0, (i \neq j, i, j=1, 2, \ldots, N) \qquad \text{[Equation 2]}$$

Figure 7:
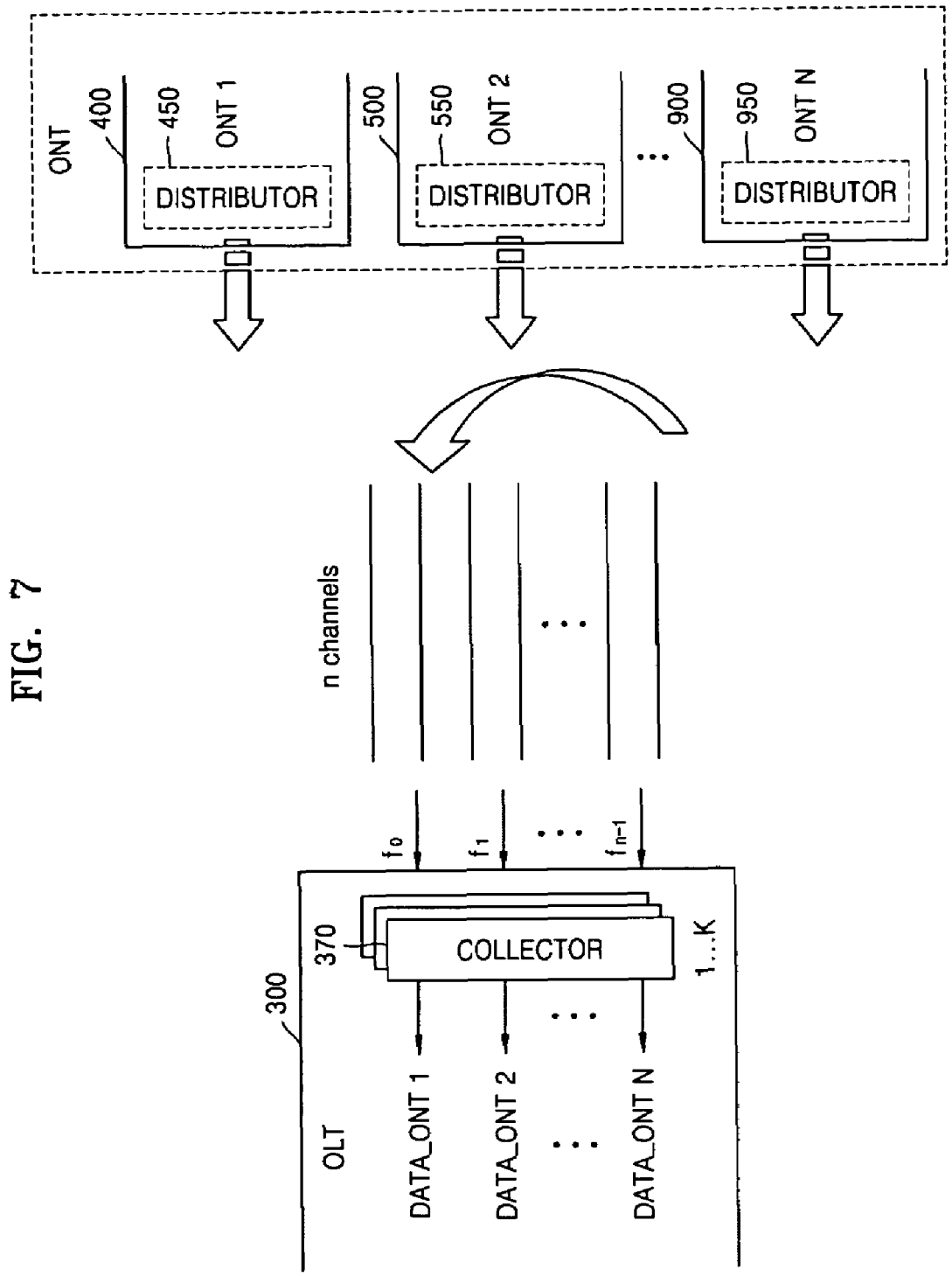
FIG. 7 illustrates an upstream media access mechanism according to an exemplary embodiment of the present invention.

FIG. 7 illustrates an upstream media access mechanism according to an exemplary embodiment of the present invention.

In a conventional TDM-PON, when an upstream from ONTs 400, ..., 900 to an OLT 300 is performed, a TDM technique that a certain ONT transmits data to the OLT 300 during a predetermined period of time by synchronization of a temporal axis is used. However, in an SCM method, a method of multiplexing a number of channels by dividing a frequency band is used as shown in FIG. 7.

Referring to FIG. 7, a channel group manager (not shown) of the ONTs 400, ..., 900 distributes data frames to allocated channels via distributors 450, ..., 950, and a distributing method used at this time is equal to that of the OLT 300. The OLT 300 collects data transmitted using each channel group via collectors 370. A channel allocation rule of an upstream from the ONTs 400, ..., 900 to the OLT 300 is equal to that of a downstream described in FIG. 6, and the same channel groups are also used.

When a network is fixedly used, the number of channels of a channel group for each of the ONTs 400, ..., 900 is fixed, and the ONTs 400, ..., 900 can always use fixed channels, respectively. The fixed channel method is simple to operate, but network efficiency is worse. Accordingly, the number of channels of a channel group must be able to be dynamically changed. Here, to independently operate an upstream and a downstream, upstream channels and downstream channels for each ONT can be separately used. However, as described above, since a channel assigned as an upstream channel or a downstream channel in a certain ONT 400, ..., 900 cannot be used in other ONTs 400, ..., 900, it is not preferable that each ONT 400, ..., 900 has separate up/downstream channels.

Therefore, in the present invention, a method of masking a certain channel by maintaining a channel group for an upstream and a downstream and distributing the channel group with time difference is used. The masking requirement occurs when an upstream and a downstream are separated to guarantee link performance due to interference effect according to optical characteristics. For example, in a WDM/SCM-PON, since a same light source is divided using a passive optical distributor (not shown) in a downstream, link performance matters little to the number of channels, however, since different light source from the ONTs 400, ..., 900 are merged using an optical connector (not shown), optical interference can be generated. As a method to minimize the optical interference, there is a method of transmitting data with one or two channels in an upstream, wherein the number of channels used in an upstream in the same ONT 400, ..., 900 is less than that used in a downstream. In this case, traffic of the downstream is much greater than that of the upstream. Therefore, asymmetric operation must be performed considering network efficiency.

When another asymmetric traffic is required, if a request of reducing a channel of using upstream or downstream channels is input, a channel group including the channel to be reduced must not be immediately changed, and after data in a buffer of the channel to be reduced is all clear during a predetermined compensation time, the channel to be reduced must be deleted from the channel group. In this case, since complexity is high for separately using upstream channels and downstream channels by changing them, in the present invention, asymmetric channels are used for a same channel group of upstream and downstream channels.

Since the collectors 370, 470, ..., 970 of up/downstream traffic shown in FIGS. 6 and 7 collect and transmit data like a link, special control for them is not necessary. However, since special masking in a channel group is necessary for the distributors 350, 450, ..., 950, channels are divided and distributed using a hash function in the distributors 350, 450, ..., 950. Here, the distributors 350, 450, ..., 950 and the collectors 370, 470, ..., 970 are loaded and operated in a central processing unit (CPU) or an equivalent processor included in the OLT 300 and the ONTs 400, ..., 900 and can be formed with software or hardware according to system configuration.

Figure 8:
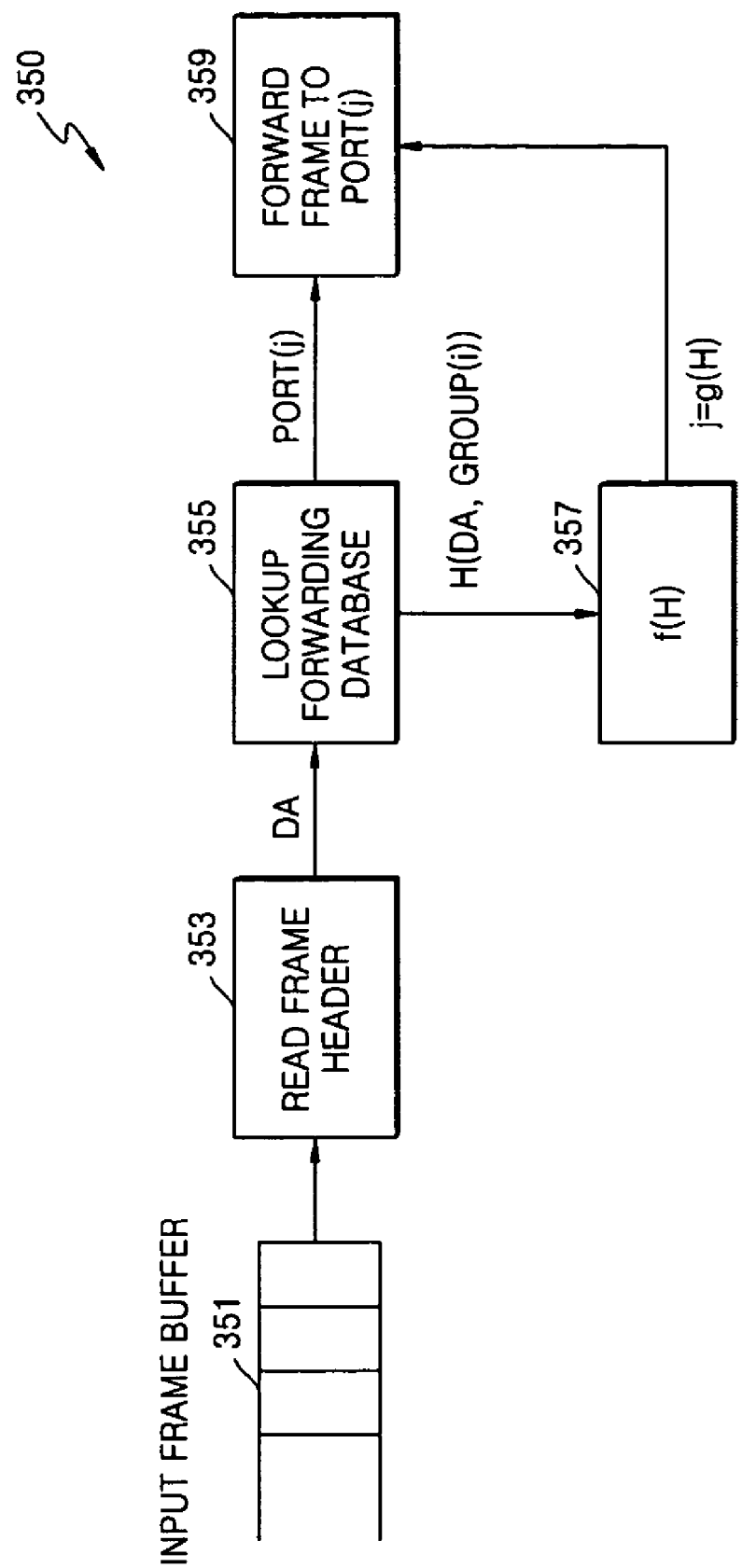
FIG. 8 illustrates a frame distribution function performed in a distributor included in the OLT and the ONT according to an exemplary embodiment of the present invention.

FIG. 8 illustrates a frame distribution function performed in a distributor included in the OLT 300 and the ONTs 400, ..., 900 according to an exemplary embodiment of the present invention.

Referring to FIG. 8, a distributor 350 receives a data packet from an ONT (or an OLT) in step 351 and reads a frame header to forward the data packet to where to be desired in step 353. If it is determined that the frame is valid by the read frame header, the distributor 350 reads a destination address (DA) in the frame header and performs lookup of the DA in a system forwarding database in step 355.

Here, if the DA has a specified port, a target is a single port ONT. Accordingly, the distributor 350 looks for an index of the port and forwards the frame to the port in step 359, and if a target port is a channel group (i) not a single port, the distributor 350 selects a port belonging to the channel group (i) using a hash function of the DA and a masking function of the channel group (i) in step 357 and forwards the frame to the selected port in step 359.

Using the DA as an element of the hash function is to minimize packet loss or sequence change effect due to transmitting frames with the same conversation to different channels. FIG. 8 describes the frame distribution function for a single port and a port belonging to a channel group. A frame distribution process for a port belonging to a channel group will now be described in detail.

Figure 9:
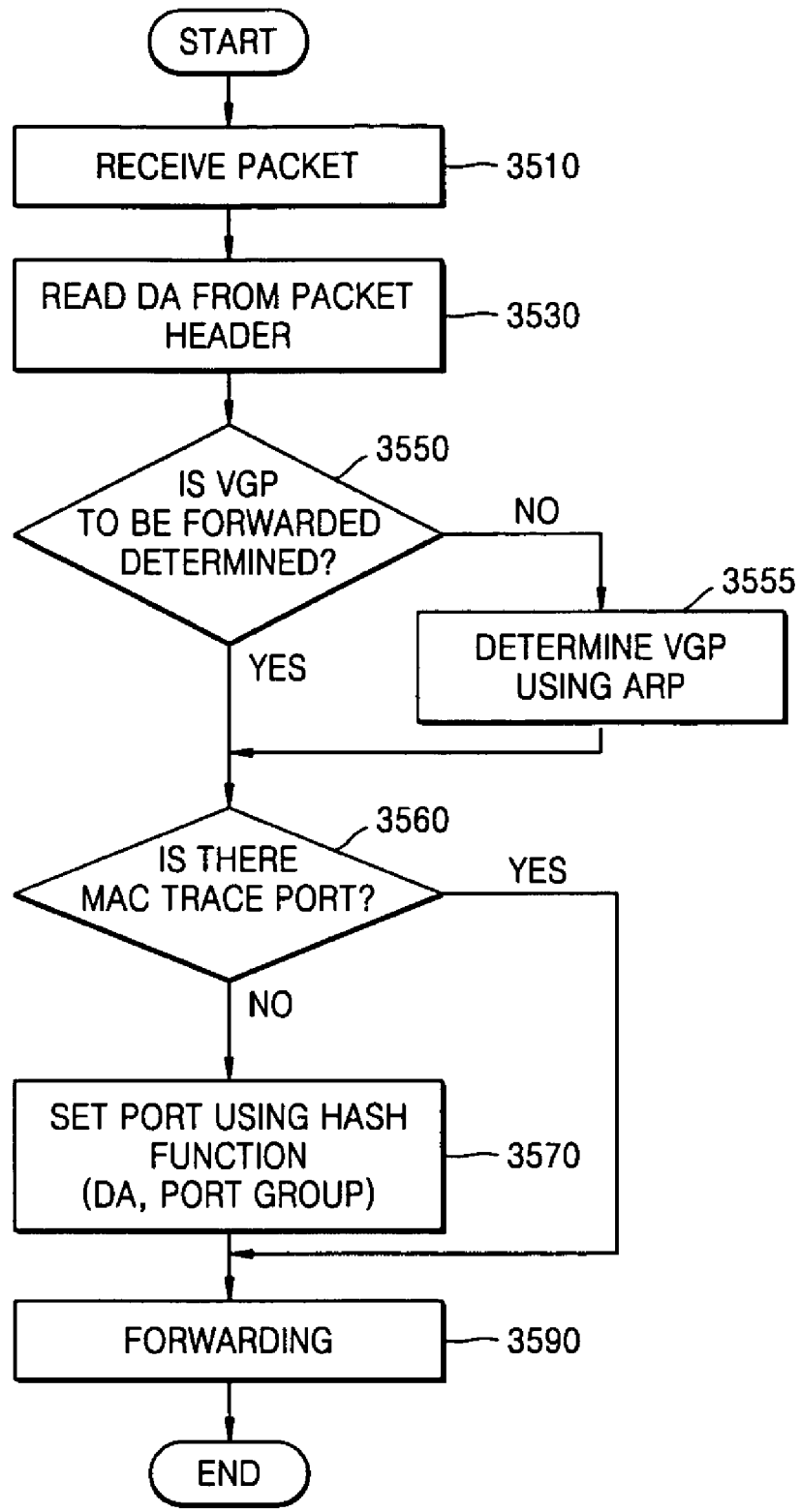
FIG. 9 illustrates a frame distribution function for a port belonging to a channel of a channel group, which is performed in a distributor included in the OLT and the ONT, according to an exemplary embodiment of the present invention.

FIG. 9 illustrates a frame distribution function for a port belonging to a channel of a channel group, which is performed in a distributor included in the OLT 300 and the ONTs 400, ..., 900, according to an exemplary embodiment of the present invention.

Referring to FIG. 9, a distributor 350 receives a data packet from an ONT (or an OLT) in step 3510 and reads a DA from a frame header to forward the data packet to where to be desired in step 3530. When a packet is received, the distributor 350 reads an arrival address (that is, a DA) from a packet header and transmits the packet to a target port using a forwarding table. Here, the target port is a virtual group port (VGP) including more than one port in real. That is, a plurality of SCM channels shown in FIGS. 6 and 7 becomes one VGP. If a VGP is not determined, the distributor 350 must look for a target VGP using an address resolution protocol (ARP). The process is as follows.

After the DA is read in step 3530, the distributor 350 searches a system forwarding database on the basis of the DA and determines whether a VGP to be forwarded is determined in step 3550. As a result of determination in step 3550, if the VGP to be forwarded is not determined, the distributor 350 determines the VGP using the ARP mapping an Internet address into a physical hardware address in step 3555.

As a result of determination in step 3550, if the VGP to be forwarded is determined, or if the VGP is determined using the ARP in step 3555, the distributor 350 determines whether there is a previously used MAC trace port in step 3560. That is, if a target VGP is determined, the distributor 350 determines a port to be forwarded among a plurality of physical ports belonging to the target VGP.

As a result of determination in step 3560, if there is a MAC trace port which a packet having a DA has previously passed through, the distributor 350 sets the port as a transmission port of a current packet and forwards the current packet to the port in step 3590. This is to reduce additional processes since, if packets with a same conversation are transmitted to different ports, additional works, such as sequence reordering, are required.

As a result of determination in step 3560, if there is not a MAC trace port, the distributor 350 selects a specified port using a hash function with parameters of a DA and a port group and determines the specified port as a trace port of the current packet in step 3570. The distributor 350 forwards the current packet to the determined port in step 3590

As described above, in a WDM/SCM-PON according to the present invention, each SCM channel is classified and used like a link by adopting an SCM technique of subdividing a wavelength band of up/downstream data links between an OLT and ONTs into frequency bands, and the ONTs are formed so that a certain SCM channel is independently distributed not fixedly assigned. Accordingly, an inventory problem, which can be generated in WDM/SCM, is prevented before happens, asymmetric dynamic band allocation is performed, and an asymmetric service of up/downstream transmission is supported. As a result, a band required for a next generation service is dynamically provided, optical interference effect is minimized, and Ethernet compatibility is provided so that an Ethernet service suitable for providing an IP service can be accommodated.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

As described above, according to a WDM/SCM-PON according to the present invention and a media access control method for asymmetric packet communication in the same, an inventory problem, which can be generated in WDM/SCM, is solved by forming ONTs so that a certain SCM channel is independently distributed not fixedly assigned.

Also, asymmetric dynamic band allocation is performed, a band required for a next generation service is dynamically provided using channels of a channel group, and optical interference effect is minimized by supporting asymmetric service of up/downstream transmission.

Besides, Ethernet compatibility is provided so that an Ethernet service suitable for providing an IP service can be accommodated.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A WDM/SCM-PON, which has passive distributors based on one of a WDM method and an SCM method, comprising:
    an OLT, which provides an independent link by dividing SCM channels of a wavelength into upstream SCM channels and downstream SCM channels, the OLT comprising a plurality of packet processing units, each which forms a downstream SCM channel by modulating a link corresponding to a transmitting signal of an MAC/PHY layer into a specifically fixed RF frequency band; and
    a plurality of ONTs, each which is connected to the OLT via the passive distributor, performs up/downstream transmission, variably operates the SCM channels, and forms an independent link with the OLT.

2. The WDM/SCM-PON of claim 1, wherein each of the OLT and the plurality of ONTs independently forms transmitting/receiving signals of a PHY layer as SCM up/downstream channels.

3. The WDM/SCM-PON of claim 1, wherein each of the OLT and the plurality of ONTs has a fixed SCM channel for each wavelength to reduce system complexity and control SCM channel allocation in the wavelength.

4. The WDM/SCM-PON of claim 1, wherein the OLT further comprises:
    the plurality of packet processing units filters each of upstream SCM channels received from the plurality of ONTs into an upstream SCM channel of a specified RF band corresponding to a receiving signal of the MAC/PHY layer.

5. The WDM/SCM-PON of claim 4, wherein the OLT further comprises:
    a distributor, which, in a case where a channel group having more than two channels is allocated to an ONT, distributes frames to be transmitted to the channel group; and a collector, which collects data transmitted from the plurality of ONTs by channel groups.

6. The WDM/SCM-PON of claim 4, wherein the ONT comprises:
    a plurality of SCM channel processing units, each which forms a link corresponding to a transmitting signal of an MAC/PHY layer as an upstream SCM channel and filters each of downstream SCM channels received from the OLT into a downstream SCM channel corresponding to a receiving signal of the MAC/PHY layer;
    an adder, which adds the upstream SCM channels generated by the plurality of SCM channel processing units;
    an optical transmitter/receiver, which transmits the result added by the adder to the OLT and receives the downstream SCM channels from the OLT; and
    an asymmetric channel control unit, which performs a channel group data distribution/collection function in an operating ONT and variably controls SCM frequency bands in response to a control signal of the OLT.

7. The WDM/SCM-PON of claim 6, wherein the ONT further comprises:
    a distributor, which distributes frames to be transmitted to assigned channels; and
    a collector, which collects data like a link when the data is received using a channel group.

8. The WDM/SCM-PON of claim 5 or 7, wherein the distributor selectively classifies and distributes channels without change of a channel group when channel group data is distributed.

9. The WDM/SCM-PON of claim 5 or 7, wherein the distributor performs selective channel distribution for each channel group by adopting a hash function having keys of a DA and a channel group ID.

10. A frame distribution method for media access control of asymmetric packet communication in a WDM/SCM-PON, the method comprising:
    (a) reading a destination address (DA) from a frame header of a packet received from an OLT or an ONT;
    (b) performing lookup of the DA in a forwarding database;
    (c) if the DA is applicable to a single channel with a specified port as a result of the lookup in step (b), forwarding the packet to the specified port; and
    (d) if the DA is applicable to a channel of a channel group without a specified port as a result of the lookup in step (b), selecting a target port using a hash function having keys of the DA and a channel group ID and forwarding the packet to the target port.

11. A frame distribution method for media access control of asymmetric packet communication in a WDM/SCM-PON, the method comprising:
    (a) reading a DA from a frame header of a packet received from an OLT or an ONT;
    (b) performing lookup of the DA in a forwarding database and determining a VGP to be forwarded;
    (c) if the VGP is determined as a result of the lookup in step (b), determining whether there is a MAC trace port which a packet having a DA equal to the DA has passed through;

(d) if the VGP is not determined as a result of the lookup in step (b), after the VGP is determined using an ARP, determining whether there is the MAC trace port;

(e) if there is the MAC trace port as a result of determination in steps (c) or (d), forwarding the packet to the MAC trace port; and (f) if there is not the MAC trace port as a result of determination in steps (c) or (d), selecting a target port using a hash function having parameters of the DA and a port group and forwarding the packet to the target port.

* * * * *